US007457835B2

(12) United States Patent
Toebes et al.

(10) Patent No.: US 7,457,835 B2

(45) Date of Patent: Nov. 25, 2008

(54) MOVEMENT OF DATA IN A DISTRIBUTED DATABASE SYSTEM TO A STORAGE LOCATION CLOSEST TO A CENTER OF ACTIVITY FOR THE DATA

(75) Inventors: John Toebes, Cary, NC (US); Bryan C. Turner, Apex, NC (US); Douglas Jay Walker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 674 days.

(21) Appl. No.: 11/073,611

(22) Filed: Mar. 8, 2005

(65) Prior Publication Data

US 2006/0206621 A1 Sep. 14, 2006

(51) Int. Cl.
*G06F 17/30* (2006.01)

(52) U.S. Cl. ....................................... 707/204; 707/100

(58) Field of Classification Search ..................... 707/1, 707/10, 100, 200, 201, 3, 204; 709/203, 709/223

See application file for complete search history.

(56) References Cited

U.S. PATENT DOCUMENTS 6,232,917 B1 5/2001 Baumer et al.
6,421,686 B1 * 7/2002 Martin, Jr. .................. 707/201
6,678,719 B1 1/2004 Stimmel
6,714,519 B2 3/2004 Luzzatti et al.
7,020,698 B2 * 3/2006 Andrews et al. ............ 709/223
2004/0198339 A1 10/2004 Martin
2006/0173855 A1 8/2006 Turner et al.

FOREIGN PATENT DOCUMENTS

| | | | |
|---|---|---|---|
| DE | 10060599 | A1 | 6/2002 |
| JP | 2001-082967 | A | 3/2001 |
| JP | 2005-056061 | A | 3/2005 |
| KR | 100565089 | | 3/2006 |
| WO | WO 0030058 | A1 | 5/2000 |
| WO | WO 0131497 | A1 | 5/2001 |

OTHER PUBLICATIONS

U.S. Appl. No. 11/053,954, filed Feb. 10, 2005, Toebes et al.
Malaika et al., "DB2 and Web services", *IBM Systems Journal*, 2002, pp. 666-685, vol. 41, No. 4.
Shi et al., "An enterprise directory solution with DB2", *IBM Systems Journal*, 2000, pp. 360-383, vol. 39, No. 2.

* cited by examiner

*Primary Examiner*—Cheryl Lewis
(74) *Attorney, Agent, or Firm*—Leon R. Turkevich

(57) ABSTRACT

A network provides distributed database services based on replicating data records to a new storage location that is closest to consumers of the data records, based on comparing a network distance between the new storage location and an attribute identifying a center of activity of at least one data element, relative to the network distance between any existing storage location in the center of activity. If the new storage location is closer to the center of activity relative to any of the other existing stores locations, than at least the one data element associated with the center of activity is copied to the new storage location. Multiple centers of activity may be utilized for respective data records, enabling data records to be copied on a per-record basis, or grouped as needed.

25 Claims, 5 Drawing Sheets

MOVEMENT OF DATA IN A DISTRIBUTED DATABASE SYSTEM TO A STORAGE LOCATION CLOSEST TO A CENTER OF ACTIVITY FOR THE DATA

BACKGROUND OF THE INVENTION

1. Field of the Invention

The present invention is related to optimizing storage of data in distributed databases. In particular, the present invention is related to moving data in distributed databases to storage locations that are closest to the client nodes that will perform the largest frequency of access for the related data.

2. Description of the Related Art

Distributed computing has evolved to technologies that enable multiple devices to share in providing a given service. For example, grid computing has been proposed as a model for solving substantially large computational problems using large numbers of computers arranged as clusters embedded in a distributed infrastructure. Grid computing has been described as differentiated from distributed computing through an increased focus on resource sharing, coordination, manageability, and high performance. The focus on resource sharing has been referred to as "the grid problem", which has been defined as the set of problems associated with resource sharing among a set of individuals or groups.

One form of distributed computing involves distributed databases. Distributed databases have been attempted in a variety of implementations, where the central goal is to distribute data among multiple locations in order to provide load-balancing. Databases are composed of tables of records, where each record (e.g., row) includes a number of elements. An element, referred to as a field or column (i.e., a column of a row includes an element), is the quantum of data that is stored (as an alphanumeric value) with other elements of the record (row) based on an established relationship; hence, a record can be illustrated as a row, and each column has corresponding field of the record.

Conventional attempts in implementing distributed databases have involved database tables being split, where table records (i.e., rows) are arbitrarily split across storage device boundaries. For example, a distributed database may store records 1-50 on a first storage device and records 51-100 on a second storage device, for example as implemented as early as the 1970s using the Honeycomb Drive technology developed by IBM. Hence, the database records are split according to a physical hierarchy of the storage devices: the database server is aware of the multiple storage devices storing the respective groups of database records, and accesses the appropriate storage device to obtain the database record as required. Hence, databases were designed (i.e. structured) such that distribution of the contents of a database were split among a number of storage devices, such as the cylinder drives used by the Honeycomb Drive technology.

Another technique of splitting contents of databases, particularly relevant to relational databases, involves dividing tables and then distributing the tables as divided across different machines based on content. For example, if a database has a number of records that exceeds the capacity for a single storage device, or if the received database queries exceed the capacity of a single database server machine, the database tables may be split among multiple database server machines, where the first machine has tables associated with a first attribute (e.g., employee identifier attributes), and the second machine has tables associated with a second attribute (e.g., salary information). One of the columns will specify which storage device stores the associated data from that table, enabling a machine executing a database server to locate the data associated with the record. Hence, a SQL query can be sent to multiple machines in order to reconstruct the requested data according to the SQL query. In addition, two tables can be created separately, and then joined at runtime in response to a SQL query.

In addition, distributed database technology includes optimizing queries (e.g., relational queries) requiring joining tables from different storage devices, where the processing of the query is optimized based on different portions of the query being processed on different machines, wherein those machines transfer their results of their respective portions of the query to another machine that compiles the respective results.

However, the necessity of performing queries by accessing tables on multiple remote storage devices, and forwarding the data to different machines, can result in costly procedures in terms of network bandwidth and latency, especially in the case of high-frequency queries that are performed repeatedly to access remote data. Moreover, as data records become more distributed based on storage across a larger number of respective storage locations, global queries suffer a decrease in performance due to the database server requiring to access each and every one of the storage locations in order to complete a global query, even if the global query specifies a substantially small subset of a data record, for example selecting all records where a specified element has a specific value (or range of values) specified in the global query.

SUMMARY OF THE INVENTION

Despite the numerous attempts at optimizing distributed database technology, there has been no attempt to date to optimize a distributed database such that the data records are moved for storage as close as possible to the consumers of the data records. In particular, it is highly desirable that data records that match a predominantly large number of data queries be stored in proximity to the database server device performing the queries on the data records. In other words, there is a need for data records to be moved as close as possible to their center of activity.

There also is a need for an arrangement that enables the data records to be moved toward a new storage location based on identifying a center of query activity for the data records at or near the new storage location.

There also is a need for an arrangement that enables database records to be replicated across multiple storage locations, enabling a database server to perform a database query based on accessing one of the multiple storage locations identified as being closest to the database server.

There also is a need for an arrangement that enables a new computing node, configured for providing distributed computing services, to join a resource group composed of other computing nodes participating in providing distributed services for resource group data, based on the new computing node determining that the resource group data has a center of query activity that is proximally located to the new computing node.

There also is a need for an arrangement that enables services to be provided in a network by multiple computing nodes, where data elements of a distributed database can be moved to a new storage location that is closer to a center of activity for the data, without the necessity of complex transfer and data integrity verification procedures that impose additional processing requirements on the system.

These and other needs are attained by the president invention, where a network provides distributed database services based on replicating data records to a new storage location that is closest to consumers of the data records, based on comparing a network distance between the new storage location and an attribute identifying a center of activity of at least one data element, relative to the network distance between any existing storage location in the center of activity. If the new storage location is closer to the center of activity relative to any of the other existing stores locations, than at least the one data element associated with the center of activity is copied to the new storage location. Multiple centers of activity may be utilized for respective data records, enabling data records to be copied on a per-record basis, or grouped as needed.

Hence, data records are stored at identified storage locations based on network topology, and query attributes that identified the center of activity from which the record accesses are deemed to have originated. Consequently, data records can be copied to storage locations that are closest to the source of the data record requests, for example a remote database server having generated a substantially large percentage of the database queries for the data records associated with the attribute identifying the center of activity.

One aspect of the present invention provides a method in a network. The method includes storing a database of records at a first storage location according to a topology of the network. Each record has at least first and second elements. The database further includes at least one data attribute element that specifies a corresponding center of activity of at least one of the elements of the database. The method also includes determining whether a second storage location has a first network distance to the center of activity that is less than a second network distance of the first storage location to the center of activity. The at least one element associated with the center of activity is copied to the second storage location based on determining the corresponding first network distance is less than the second network distance.

Another aspect of the present invention provides a network having a plurality of storage locations and a plurality of database server resources. The storage locations are identifiable according to a topology of the network, and at least a first of the storage locations stores a database of records. Each record has at least first and second elements. The database also includes at least one data attribute element that specifies a corresponding center of activity of at least one of the elements of the database. The database server resources are at respective access locations in the topology, each configured for performing a database query on the database, wherein the center of activity is updated based on each access from the corresponding access location. Further, the at least one element associated with the center of activity is copied to a second of the storage locations, in response to a determination in the network that the second of the storage locations has a first network distance to the center of activity that is less than a second network distance of the first of the storage locations to the center of activity.

Still another aspect of the present invention provides a method in a computing node. The method includes identifying available resource groups within a network, each resource group having corresponding resource group attributes including a data attribute and a resource requirement for providing a corresponding distributed computing service within a network. The data attribute specifies at least one center of activity within a topology of the network for a corresponding collection of data elements associated with the distributed computing service. The method also includes identifying one of the available resource groups having the corresponding at least one center of activity that is closest to a network location of the computing node. The method also includes selectively joining the one available resource group based on determining the corresponding resource requirement is less than an available node capacity, and based on a determined network distance between the network location and the at least one center of activity.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
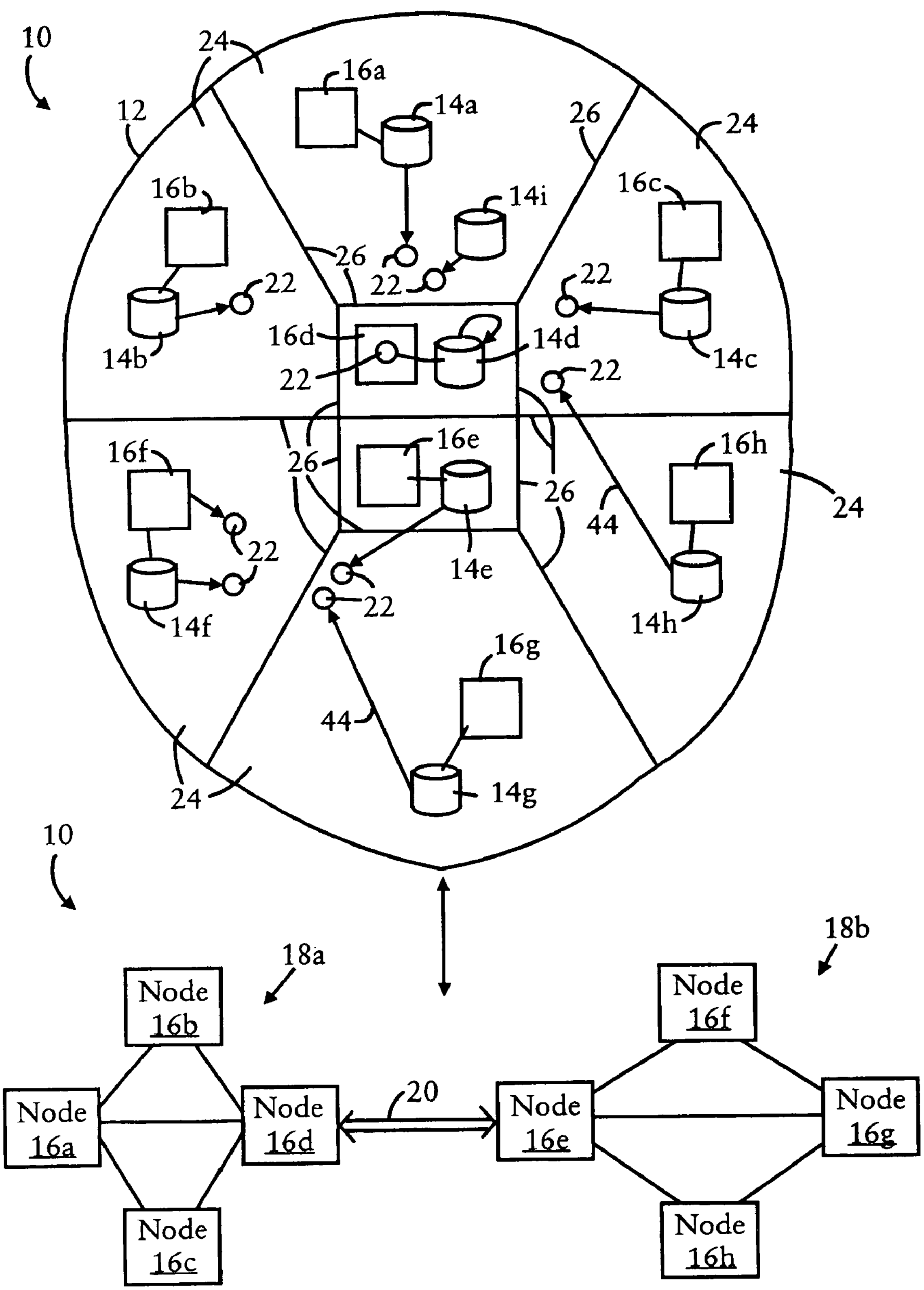
FIG. 1 is a diagram illustrating a distributed network having multiple computing nodes configured for providing distributed database services throughout multiple storage locations, according to an embodiment of the present invention.

FIG. 1 is a diagram illustrating a network 10 having an identified topology, illustrated by a topology map 12, and having multiple storage locations 14 and computing nodes 16 for distributed storage of database records, according to an embodiment of the present invention. As illustrated in FIG. 1, each computing node 16 has an associated storage location 14, either internal to the computing node 16 or externally local to the computing node, as shown in FIG. 1. In addition, a mass storage device may be implemented within the network 10 independent of any computing node 16, as illustrated by the storage location 14*i*.

As described below, the topology 12 illustrates a cost-based multidimensional space that positions storage locations 14 and computing nodes 16 relative to cost-based dimensions that identify a "network distance" between different locations within the topology. For example, the nodes 16*a*, 16*b*, 16*c*, and 16*d* are positioned within the topology 12 based on their connectivity within a first local area network 18*a* of the network 10, and the nodes 16*e*, 16*f*, 16*g*, and 16*h* are positioned within the topology 12 based on their connectivity within a second local area network 18*b*, the nodes 16*d* and 16*e* being interconnected via a wide area communications link 20.

As described below, each storage location 14 has at least one corresponding center of activity 22 that identifies for the associated records at the corresponding storage location 14 a logical origin of all access attempts to the associated records within the storage location 14. For example, the storage location 14*d* has a center of activity 22 that is located within the computing node 16*d*, indicating that all access attempts for the data records within the storage location 14*d* that are associated with that center of activity within the computing node 16*d* originate exclusively from the computing node 16*d*. In contrast, the center of activity of the other storage locations 14*a*, 14*b*, 14*c*, 14*e*, 14*f*, 14*g*, 14*h*, 14*i* are located at different locations throughout the topology 12 based on an aggregation of requests having been received from various computing nodes throughout the network.

According to the disclosed embodiment, data records are replicated to a storage location 14 that is closest to the corresponding center of activity 22 associated with the data records. As described below, query attributes are used to describe database queries that are performed on the data records within each of the storage locations 14, including identifying a logical center 22 of the query activity for the data records relative to all queries that have been generated from different query servers (e.g., computing nodes 16) at respective locations.

Hence, the data records stored at the storage location 14*h* may be replicated to the storage location 14*c*, based on the center of activity 22 of the storage location 14*h* having crossed a site boundary 26 into the site 24 encompassing the storage location 14*c*. Consequently, the network distance (i.e., vector) 44 between the storage location 14 (e.g., 14*h*) and the center of activity 22 can be reduced based on replicating the data into a closer storage location 14*c*.

The disclosed embodiment is particularly effective among distributed servers in an enterprise-class network, for example a large-scale network deployed at a university or a multi-building office campus. In other words, a computing node (e.g., 16*a*) within a particular site 24, defined for example as a collection of network nodes residing within prescribed cost boundaries 26 of the network 10, will execute a database server resource that executes a set of prescribed queries on a regular basis on a subset of the records of the entire distributed database. For example, a multi-office corporation may employ an enterprise system composed of local area networks (LANs) 18*a*, 18*b* deployed in each group of locally connected offices, and WAN links 20 interconnecting the local area networks between offices. Hence, the network nodes 16*a*, 16*b*, 16*c*, and 16*d* can be associated with respective offices at one geographic site (e.g., an office campus in North Carolina), and the network nodes 16*e*, 16*f*, 16*g*, and 16*h* can be associated with respective offices at another geographic site (e.g., an office campus in California). In this example, most of the database queries for a first office will be for a first collection of records that are relevant to that first office; in contrast, only a few queries generated within the first office will tend to be for other records that are relevant to a second office that has little or no relationship with the first office.

Hence, the disclosed embodiment enables data records to be replicated to a new location within a distributed network based on the query attributes, enabling the data records to be stored in proximity to the center of query activity 22. Consequently, database access operations on the relevant data records are optimized based on moving the data records to the optimum location relative to the center of query activity that identifies the optimum location for storage of the data based on the database queries on the data records throughout the network. As result, database queries on data records stored at distant locations can be minimized.

Figure 2:
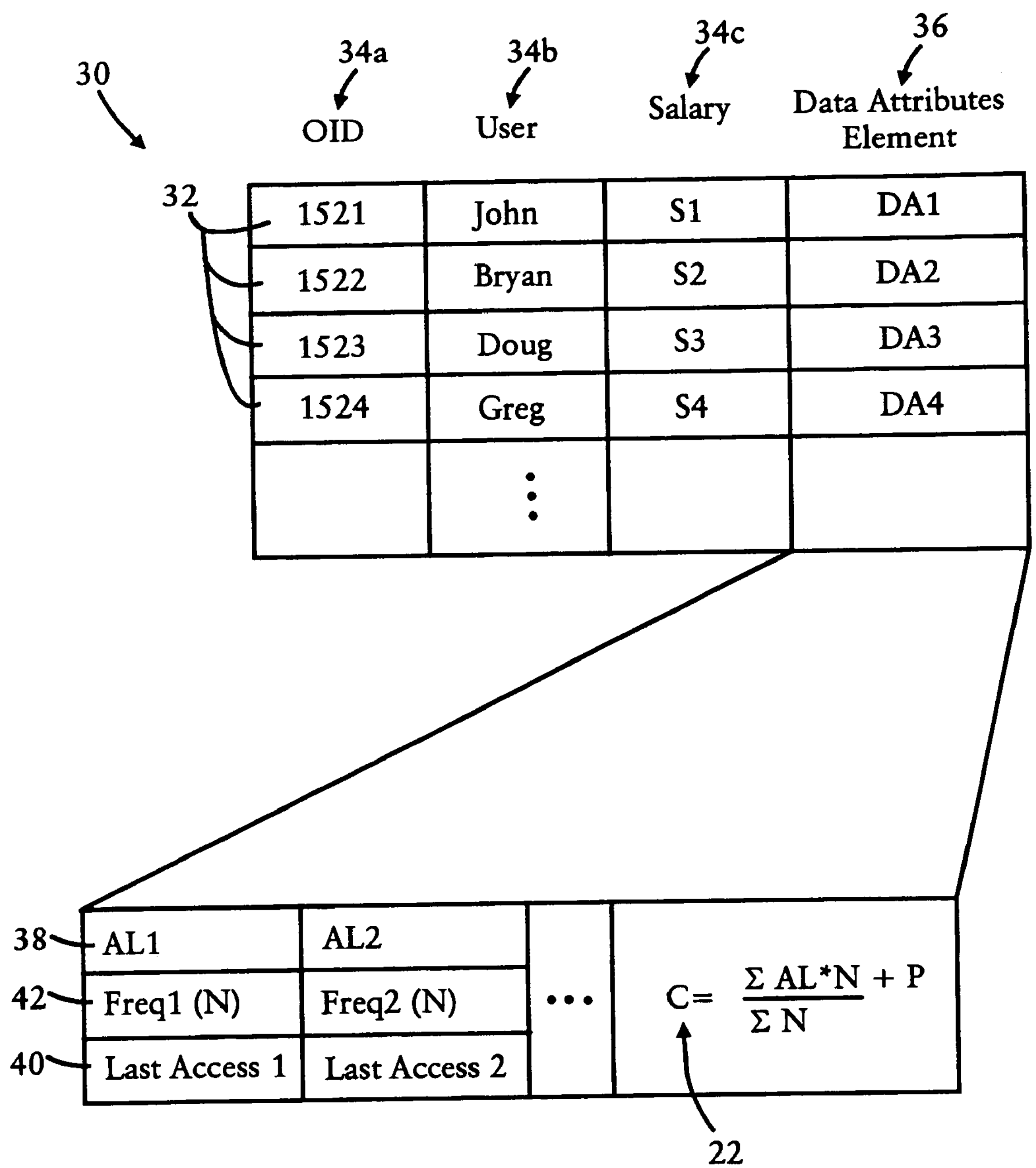
FIG. 2 is a diagram illustrating a database table having records including data attributes for identifying access attributes of the respective records.

FIG. 2 is a diagram illustrating a table 30 of the distributed database deployed among the multiple storage locations 14*a*, 14*b*, etc., according to an embodiment of the present invention. The table 30 includes multiple records 32, also referred to as "rows", that include multiple data elements 34, for example a unique object identifier (OID) field 34*a* that uniquely identifies the corresponding record 32, a user field 34*b* that identifies a user name, and another data field 34*c* such as a salary field or other associated information relevant to the user name. Each record 32 also includes a corresponding data attribute element 36 that specifies attributes associated with the corresponding record 32.

In particular, the data attribute element 36 is created by the database server resource executed by the computing node 16 during storage of the associated elements 34*a*, 34*b*, and 34*c* of the record 32. The record attributes field 36 is configured for storing access attributes that identifies the source of data accesses, namely where the data is being accessed from. The access attributes 36 may include attribute components such as last accessed location (AL) 38, last accessed time 40, access frequency 42 that identifies how often the data is accessed (how "hot" is the data), etc. As illustrated in FIG. 2, the record attributes element 36 may store individual access statistics for multiple access locations 38.

Figure 4:
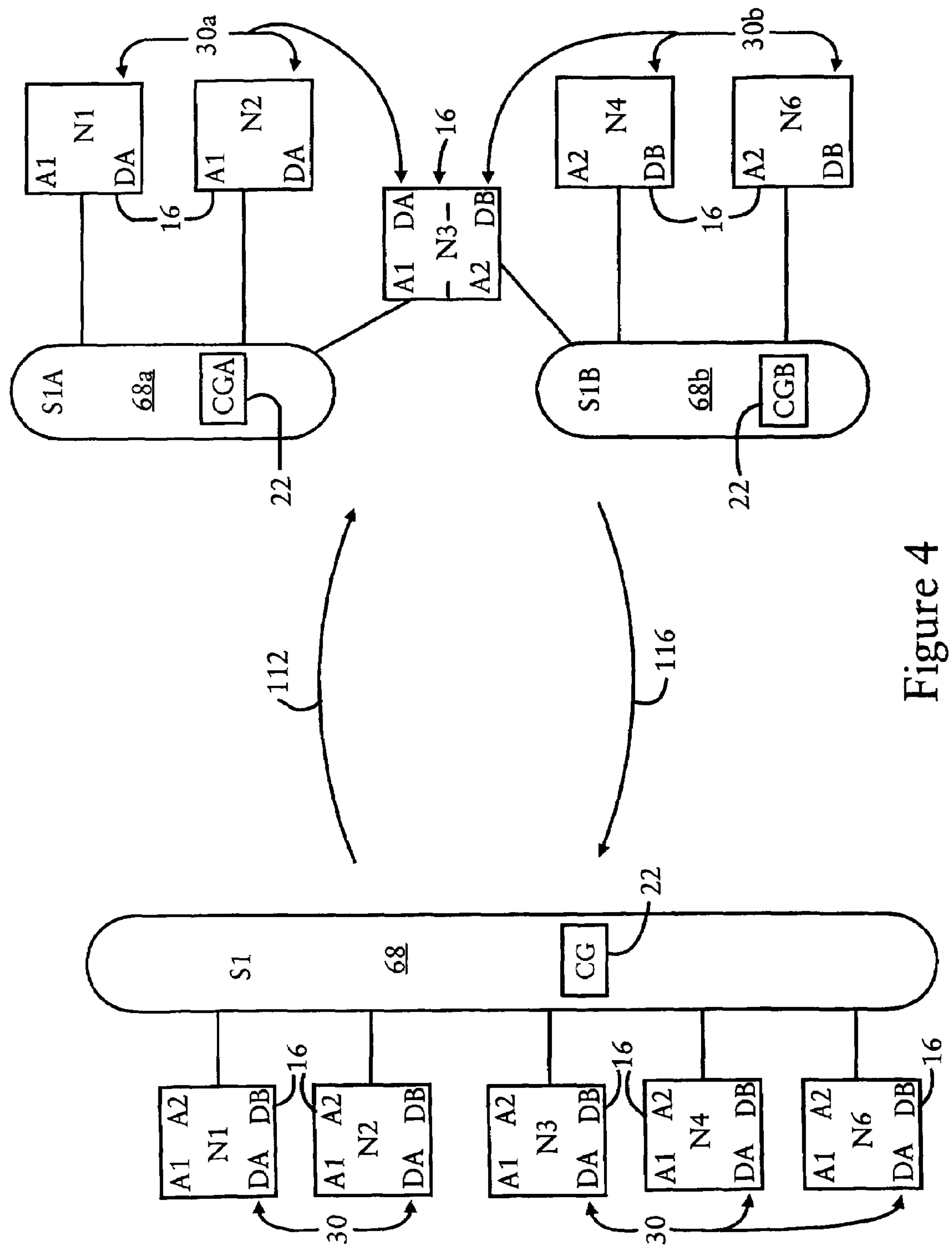
FIG. 4 is a diagram illustrating computing nodes of a resource group migrating data based on arbitrating for dividing the resource group into divided resource groups, and arbitrating for merging resource groups into a merged resource group, according to an embodiment of the present invention.

As described above, the accessed location 38 is preferably identified using networked topology-based coordinates: the use of network topology-based coordinates enables the accumulation of all of the access locations (AL) 38 (i.e., the location of the device 16 having requested the data) relative to the number of requests N from those respective locations. In other words, each access location AL 38 that has issued a number of requests N 42 exhibits a tendency (i.e., "desire" or "want") for the data that can be expressed as a vector (V). The origin of the vector is the network-topology based coordinates of the storage location of the data at the local site, the direction of the vector is from the origin to the corresponding access location AL, the magnitude of the vector is based on the location that originated the request, and the "strength" of the vector is based on the corresponding number of access attempts (N). In particular, a given piece of data will have many vectors, each originating at the datum's current storage location, and pointing at the location of the requestor, where each vector has a "strength" or "thickness" corresponding to how much the data wants to move along that path. The summation of all these vectors produces an aggregate vector 44. Consequently, the vectors of all the access locations AL 38 that have accessed the corresponding data record can be accumulated to obtain a cumulative vector (i.e., network distance) 44, illustrated in FIG. 1, that identifies the center of query activity (C) 22 for either a given record, as illustrated in FIG. 2, or an aggregate center 22 of activity for all stored records as illustrated in FIGS. 1 and 4. The aggregate vector 44 can be used to determine whether a split or a merge needs to be performed, described below.

The network topology-based coordinates may include bandwidth, throughput, hop count, round-trip time delay, the cost of accessing data, etc., and any other attributes that quantify the relative ability (i.e., "network distance") to move data to and from another machine based on a comparison of the respective coordinates of the source and destination machines. Hence, the network distance between two nodes identifies the relative ability to move data between the two nodes. Additional details related to the use of topology-based coordinates to determine a network distance are described in commonly-assigned, copending application Ser. No. 11/049,559, filed Feb. 2, 2005, entitled "Techniques For Locating Distributed Objects On A Network Based On Physical Communication Costs" the disclosure of which is incorporated in its entirety herein by reference.

Hence, the stored attribute components 36 of the respective records 32 may be considered as coordinates that are used to create an n-dimensional vector 44 that identifies the direction that the data wants to move; the access frequency (N) 42 identifies the magnitude that the data wants to move in the identified direction.

Hence, a data record 32 that is predominantly accessed locally tends to have a vector 44 that points locally, as illustrated with respect to the center of activity 22 for the storage location 14*d*. The magnitude of the vector 44 increases in proportion to the number of local accesses.

Over time, the data record may be accessed by another remote access location, for example a remote database server executed by a remote computing node 16, or a user performing searches for that particular data record. Hence, the access of the data record 32 by another remote access location will change the center of activity 22 accordingly.

If over time the center of activity 22 moves to a location that is outside the boundaries 26 of the local site 24 and within the boundaries of another site 24, the data record will be transferred to a storage location 14 within the new site in order to minimize the length of the network distance as measured between its origin and its center of activity 22.

Also note that the vector 44 can be influenced by application-based attributes (P), illustrated in FIG. 2 as part of the calculation of the center (C) 22, that are distinct from the system-based attributes 38, 40, 42. In particular, application-based resources may add predictive attributes to the vector 44 indicating a likelihood that the data will be used by a given site in the network, causing a slight adjustment to the vector 44. For example, the predictive attributes may be used to classify data as belonging to a prescribed type of data, where engineering-based data may be more suited for engineering sites, sales data may be more suited for sales offices, accounting data may be more suited for corporate offices, etc.

Hence, if a vector 44 (i.e., network distance) can be shortened by moving it to a different site, and sufficient time has passed that indicates that the vector 44 is stable (i.e., will not deviate substantially over a given time), the relevant data record 32 will be moved to reduce the network distance 44. Consequently, over time each of the data records cluster in the location that they are most used.

The foregoing description assumes that the distance-based calculation is performed by each database server performing the corresponding access attempt for a given row 32, although the calculation of a given center of activity 22 may be used for groups of rows (i.e., moving at least one row). In addition, the disclosed embodiment may be modified such that selected columns 34*a*, 34*b*, 34*c* of a row 32 are sent to a distant location, as opposed to all the elements 34*a*, 34*b*, 34*c* or a row 32, for example in the case elements that are infrequently accessed relative to other elements of the same record 32 which are frequently accessed. In this case, a database table can be split based on the fields 34 that are transferred to the new location relative to the remaining fields 34 of the data row 32 which are not transferred. Although the above-described migration of data could be performed on a per-element basis, such an arrangement may be costly; hence, it is expected that for any given record 32, at least a tuple of elements 34 will be replicated to a new location, where a tuple is defined as a data object having at least two elements 34. One skilled in the art would be able to identify the minimum quantum of data that would need to be transferred, depending on implementation and associated costs in the network. Regardless of the number of elements transferred, the data stored in the new location will include the corresponding record attributes field.

As described below, the disclosed embodiment utilizes multiple computing nodes 16 that are configured to join resource groups in order to collectively participate in replication of data and providing distributed services to clients, where clients can be identified either as (1) user nodes that request a distributed service or (2) computing nodes that have not yet joined the resource group providing the identified distributed service. A computing node 16 may selectively join a resource group in order to obtain a replica of the data 30, based on identifying that the location of the computing node 16 is closest to the corresponding center of activity 22.

Further, a computing node may determine that a resource group needs to be divided into divided resource groups having respective portions of the database, based on identifying that the center of activity 22 has moved beyond an identifiable distance from the remaining computing nodes. Hence, data migration of data records 32 can be implemented based on a computing node 16 selectively joining a resource group having data with a centers of activity 22 that is proximal to the computing node 16, and leaving or splitting a computing group of based on the corresponding center of activity being located remotely from the computing node 16. Additional details related to the selective joining a resource groups by a computing node 16 are disclosed in commonly-assigned, copending application Ser. No. 11/053,954, filed Feb. 10, 2005, entitled "Distributed Computing Based on Multiple Nodes with Determined Capacity Selectively Joining Resource Groups Having Resource Requirements", the disclosure of which is incorporated in its entirety herein by reference.

Figure 3:
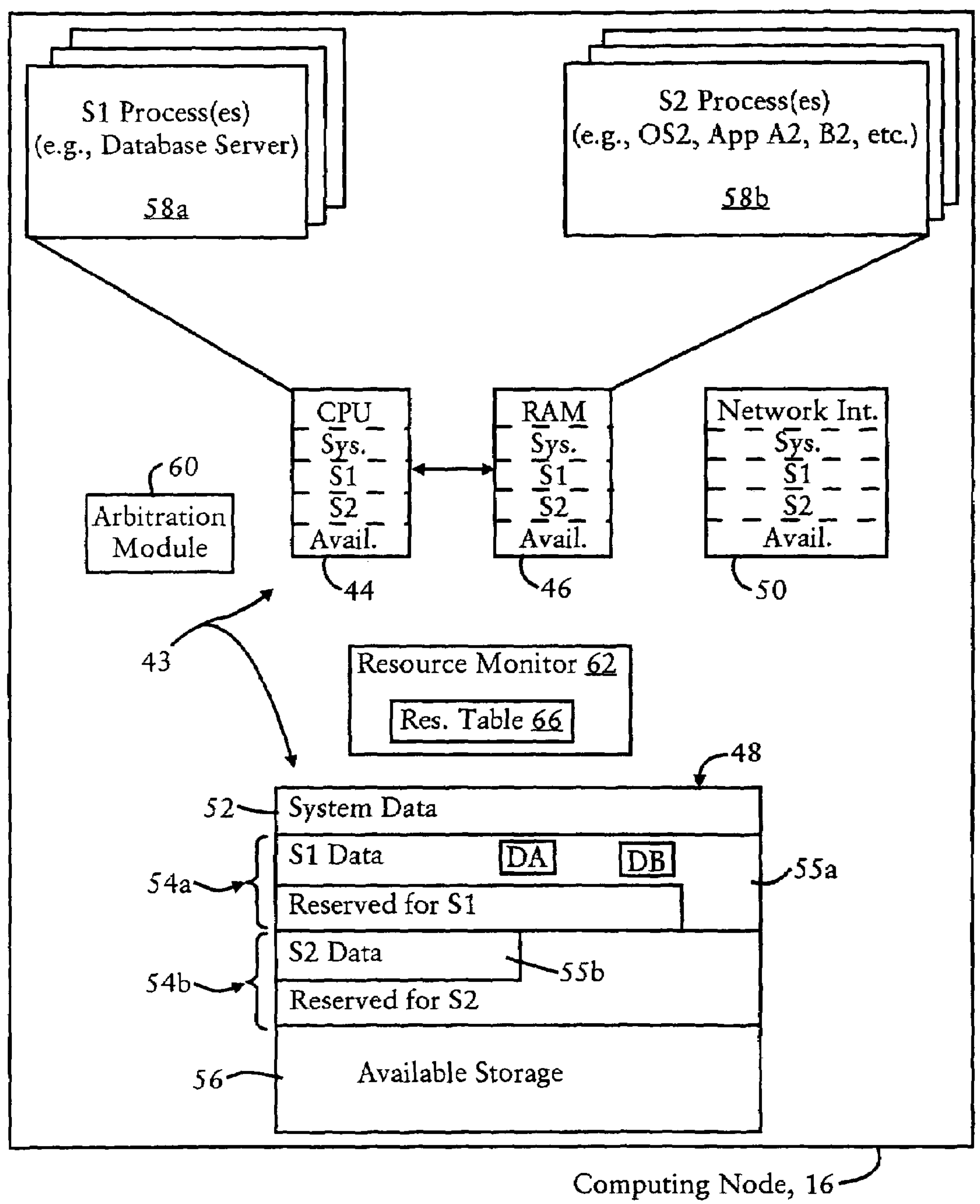
FIG. 3 is a diagram illustrating one of the computing nodes, according to an embodiment of the present invention.

FIG. 3 is a diagram of a computing node, reproduced from the above-incorporated application Ser. No. 11/053,954, that illustrates the computing node 16 according to an embodiment of the present invention. Each computing node 16 includes computing node resources 43 including a processor unit 44, processor memory 46, data storage 48 equivalent to the storage devices at locations 14 in FIG. 1, and a network interface 50. As illustrated in FIG. 3, the data storage 48 includes a reserved portion 52 for storage of system data, reserved portions 54*a* and 54*b* for storage of data associated with respective joined resource groups "S1" and "S2", and an available storage portion 56 that is free space that is available for use. As illustrated in FIG. 3, the execution of software by the processor 44 using processor memory 46 may result in instantiation and execution of executable processes 58*a* and 58*b* for the respective resource groups "S1" and "S2", where each of the processes 58*a* and 58*b* may include their own distinct operating systems, applications, etc. As illustrated in FIG. 3, the process 58*a* is configured for executing a database server resource configured for adding the data attribute element 36 to the corresponding record 32, performing database queries as requested by clients, and updating the attributes 36 for each accessed record 32 to maintain the accuracy of the corresponding center of activity 22.

As illustrated in FIG. 3, the CPU 44, the processor memory 46, and a network interface 50 each have portions of their respective resources allocated for system use, the joined resource groups "S1" and "S2" and available capacity that is available for use.

The computing node 16 also includes a resource monitor 62 configured for continually monitoring the resource utilization in each of the computing node resources 44, 46, 48, and 50, and updating a resource table 66 to indicate the amount of computing node resources that are consumed by each of the joined resource groups 68, illustrated in FIG. 4, relative to the reserved capacity as specified in the resource table 66. The resource monitor 62 also is configured for determining the available node capacity based on comparing the total system capacity minus the reserved capacity 34 that has already been allocated. The resource monitor 62 also is configured for comparing the amount of consumed resources relative to reserved capacity for a given resource group, and predicting when the amount of consumed resources for a resource group may exceed the resource requirements of the resource group, necessitating a split in the resource group.

The computing node 16 also includes a resource group arbitration module 60 configured for reading the resource table 66 in order to identify the available node capacity determined by the resource monitor 62. The resource group arbitration module 60 is configured for selectively creating a new resource group 68, as needed for example due to internal attributes including administrator settings, etc. The resource group arbitration module 60 also is configured for identifying available resource groups 68, for example by accessing a directory service identifying all available resource groups 64, and selectively joining resource groups 68 based on the associated group attributes including identifying whether the computing node 16 is closed to a corresponding center of activity 22 for the resource group 68, and also based on whether the resource requirement of the available resource group 68 is less than the available node capacity 32. Based on the available node capacity being sufficient for the resource requirement, the arbitration module 60 can allocate reserve capacity 34 and join the resource group 68, if desired. The arbitration module 60 can continue to selectively join additional resource groups 68 based on the available node capacity being sufficient for the corresponding resource requirement.

Figure 5:
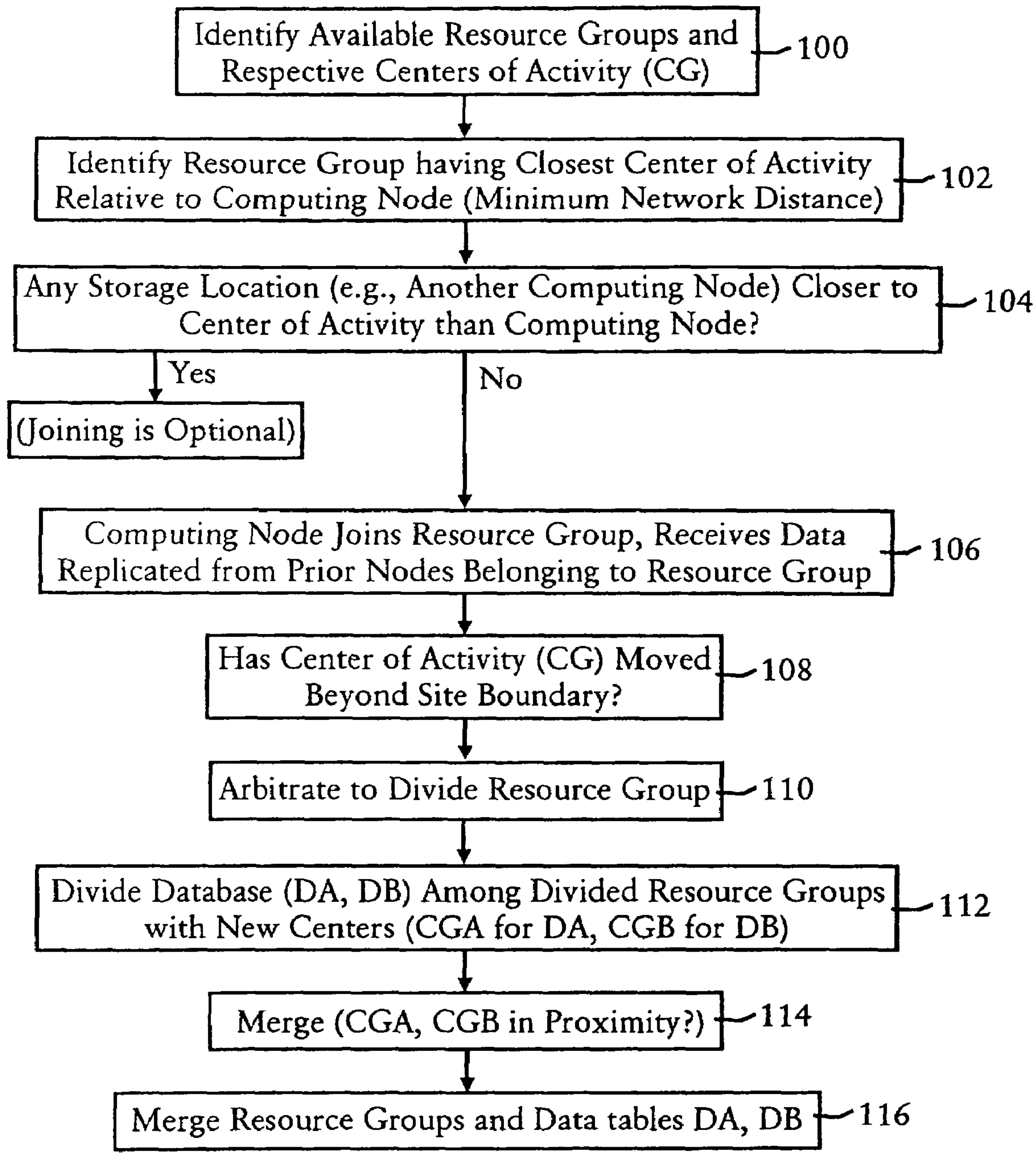
FIG. 5 is a diagram illustrating the method of migrating data based on joining of resource groups based on a center of data activity, according to an embodiment of the present invention.

FIG. 5 is a diagram illustrating the method of creating and joining resource groups 68 and a network 10 in order to provide migration of data within the network 10 according to a center of activity, according to an embodiment of the present invention. The steps described herein can be implemented in each network node as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

As described above, data records are replicated as computing nodes 16 join and leave a computing group 68. Hence, the method begins in step 100, where the arbitration module 60 of a given computing node 16 identifies available resource groups within a network, and identifies in step 102 any one of the available resource groups having at least one center of activity 22 that is closest to the network location of the computing node 16. As described above, each record 32 includes a corresponding center of activity (C) that logically identifies the virtual origin of queries for the corresponding data record 32 within the network topology 12. In addition, the resource group 68, illustrated in FIG. 4, includes an aggregate center of activity (CG) 22 for the resource group 68.

Hence, the arbitration module 60 of the computing node 16 will identify in step 102, from among the available resource groups, the aggregate center of activity 22 that is closest to the computing node 16. The computing node will then decide in step 104 whether to join the resource group based on whether the computing node is closer to the center of activity 22 identified by the vector (i.e., network distance) 44 than any other existing computing node. If the vector 44 of the computing group identifies that the center of activity 22 is closest to the computing node, then that computing node will join the resource group 68 in step 106, which includes the replicating of the data by the members of the computing group to the newly-joined computing node 16, enabling the newly-joined computing node 16 to receive a replica of the data stored in the computing group 68.

Hence, if a small group of substantially large computing nodes participate in all of the available computing groups, then any query that requires access to all of the databases can be performed by a single one of the large computing nodes that belongs to all the resource groups 68 storing respective databases.

In addition, a group of computing nodes may split based on determining that the center of activity 22 has moved beyond a desired distance, illustrated in FIG. 4. In particular, the arbitration module 60 of one of the computing nodes 16 determines whether a need for a change in the resource group attributes is needed based on determining in step 108 of FIG. 5 whether the center of activity (CG) 22 has moved beyond an identifiable distance from at least some of the other computing nodes of the resource group 68. As described above, the identifiable distance may be quantified based on the vector 44 crossing a site boundary 26.

Assuming in step 108 that the arbitration module 60 detects that the aggregate center of activity (CG) 22 for the resource group has moved beyond an identifiable distance based on crossing a site boundary 26, the arbitration module 60 arbitrates in step 110 with the arbitration modules of the other computing nodes of the resource group 68 to divide (i.e., split) the resource group 68 (e.g., "S1") into a first divided resource group 68*a* (S1A) and a second divided resource group 68*b* (S1B), where the database 30 (e.g., having data elements DA, DB) is split in step 112 between the divided resource groups 68*a* and 68*b* as divided records 30*a* and 30*b*, respectively, having respective centers of activity (CGA and CGB) 22. Hence, a computing node that rarely needs to access a given set of data can leave the computing group and reclaimed capacity that had been used for that computing group.

Hence, the transfer of data to a new computing node based on the computing node joining the resource group storing the data enables a smooth transition in data migration based on participation of replication of the data among the other computing nodes of the resource group. Once the new computing node has received all the data based on its replication into the new computing node, the new computing node can negotiate with the other computing nodes to split the resource group into a new resource group having computing nodes that are in proximity with the center of activity 22.

Also note that be divided resource groups 68*a* and 68*b* can merge in step 116 to form a merged resource group (S1) 68, based on determining in step 114 that the respective centers of activity CGA and CGB 22 are substantially in proximity with each other, and based on the respective data tables 30*a* and 30*b* having common attributes that enables the tables 30*a* and 30*b* to be merged into a single database table 30.

Hence, the use of resource groups to transfer data throughout a network based on its center of activity 22 ensures that the data is reliably transferred to the new location, without the necessity of a complex transfer and data integrity verification procedure that would otherwise be required in an atomic transfer, where a transmitting node is unable to verify whether all the data has been received by a destination node.

Although the disclosed embodiment has been described with respect to distributed computing nodes providing distributed services and replication of data, it will be readily apparent from the description of FIGS. 1 and 2 that the invention also can be implemented as a stand-alone system, where the database servers 16 operate distinct and independently of each other, whereby data is copied to a destination storage location using a prescribed data transfer and validation protocol.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network, the method comprising:

storing a database of records at a first storage location according to a topology of the network, each record having at least first and second elements, the database further including at least one data attribute element that specifies a corresponding center of activity of at least one of the elements of the database, the center of activity representing a location, within the topology, of a determined logical origin for all access attempts of the corresponding at least one element;

determining whether a second storage location has a first network distance to the center of activity that is less than a second network distance of the first storage location to the center of activity; and copying the at least one of the elements associated with the center of activity to the second storage location based on determining the corresponding first network distance is less than the second network distance.

2. The method of claim 1, wherein the copying is further based on determining that the second network distance has exceeded a network cost relative to the topology.

3. The method of claim 2, further comprising updating the center of activity based on each access of the corresponding at least one of the elements, the updating based on a network location in the topology of a database server having performed the corresponding access.

4. The method of claim 3, wherein the database includes a corresponding center of activity for each of the records, the determining, copying, and updating being performed on a per-record basis.

5. The method of claim 1, wherein the copying includes selecting the at least one element, relative to others of the elements, based on identifiable data attributes of the at least one element that are distinct from the others of the elements, the at least one element being copied to the second storage location without the others of the elements.

6. The method of claim 1, wherein:

the storing is performed by at least one computing node having the first storage location, the at least one computing node storing the database of records based on participating in a resource group that provides a distributed computing service within the network;

the determining is performed by a new computing node having the second storage location and during a determination of whether the new computing node should join the resource group for providing the distributed computing service; and the copying based on the at least one computing node of the resource group replicating the database of records to the new computing node based on the new computing node having joined the resource group.

7. The method of claim 6, further comprising:

detecting, by one of the computing nodes of the resource group, a need for a division in the resource group based on determining the center of activity has moved beyond an identifiable distance from at least a subset of other computing nodes having joined the one available resource group;

arbitrating, among the computing nodes of the resource group, for dividing the resource group into first and second divided resource groups having first and second portions of the database of records with first and second centers of activity, respectively; and dividing the resource group into the first and second divided resource groups based on the computing nodes of the resource group each selectively joining at least one of the first and second divided resource groups, each computing node selectively joining said at least one of the first and second divided resource groups based on the corresponding one of the first and second centers of activity relative to the corresponding network location.

8. The method of claim 7, wherein the arbitrating includes splitting the first and second elements of each of the records into the first and second portions, respectively.

9. A network comprising:

a plurality of storage locations that are identifiable according to a topology of the network, at least a first of the storage locations storing a database of records, each record having at least first and second elements, the database further including at least one data attribute element that specifies a corresponding center of activity of at least one of the elements of the database, the center of activity representing a location, within the topology, of a determined logical origin for all access attempts of the corresponding at least one element;

a plurality of database server resources at respective access locations in the topology, each configured for performing a database query on the database, the center of activity being updated based on each access from the corresponding access location;

wherein:

the at least one of the elements associated with the center of activity is copied to a second of the storage locations, in response to a determination in the network that the second of the storage locations has a first network distance to the center of activity that is less than a second network distance of the first of the storage locations to the center of activity.

10. The network of claim 9, wherein the copying is further based on determining that the second network distance has exceeded a network cost relative to the topology.

11. The network of claim 10, wherein the database includes a corresponding center of activity for each of the records, the updating of the center of activity, the determination that the first network distance is less than the second network distance, and the copying of the at least one of the elements being performed on a per-record basis by the database server resource performing the access on the first of the storage locations.

12. The network of claim 9, wherein the at least one element is selected from others of the elements, based on identifiable data attributes of the at least one element that are distinct from the others of the elements, the at least one element being copied to the second storage location without the others of the elements.

13. The network of claim 9, wherein the storage locations and the database server resources are composed of:

a first plurality of computing nodes configured for providing distributed computing services within the network based on participation in a resource group, the first plurality of computing nodes providing a respective first group of the storage locations that store the database, the first plurality of computing nodes further providing a first respective group of executable instances providing a first portion of the database server resource, and a new computing node providing said second of the storage locations and one of the database server resources, the new computing node configured for determining said first network distance and said second network distance during a determination of whether the new computing node should join the resource group for providing the distributed computing service;

the first plurality of computing nodes configured for copying the database to the new computing node based on the new computing node having joined the resource group.

14. The network of claim 13, wherein in response to one of the computing nodes of the resource group detecting a need for a division in the resource group, based on determining the center of activity has moved beyond an identifiable distance from at least a subset of other computing nodes having joined the one available resource group:

the computing nodes of the resource group are configured for arbitrating for dividing the resource group into first and second divided resource groups having first and second portions of the database of records with first and second centers of activity, respectively; and the computing nodes of the resource group are configured for dividing the resource group into the first and second divided resource groups based on the computing nodes of the resource group each selectively joining at least one of the first and second divided resource groups, each computing node selectively joining said at least one of the first and second divided resource groups based on the corresponding one of the first and second centers of activity relative to the corresponding network location.

15. The network of claim 14, wherein the arbitrating includes splitting the first and second elements of each of the records into the first and second portions, respectively.

16. A method in a computing node, comprising:

identifying available resource groups within a network, each resource group having corresponding resource group attributes including a data attribute and a resource requirement for providing a corresponding distributed computing service within a network, the data attribute specifying at least one center of activity within a topology of the network for a corresponding collection of data elements associated with the distributed computing service, the center of activity representing a location, within the topology, of a determined logical origin for all access attempts of any of the data elements within the corresponding collection of data elements;

identifying one of the available resource groups having the corresponding at least one center of activity that is closest to a network location of the computing node; and selectively joining the one available resource group based on determining the corresponding resource requirement is less than an available node capacity, and based on a determined network distance between the network location and the at least one center of activity.

17. The method of claim 16, wherein one of the distributed computing services includes replicating data, the selectively joining including receiving a replica of at least a portion of the collection of data elements based on the corresponding at least one center of activity.

18. The method of claim 17, further comprising:

detecting a need for a change in the resource group attributes for the one available resource group based on determining the at least one center of activity has moved beyond an identifiable distance from at least a subset of other computing nodes having joined the one available resource group;

arbitrating, between the other computing nodes having joined the one resource group, for dividing the one resource group into first and second divided resource groups having first and second portions of the collection of data elements with first and second centers of activity, respectively; and selectively joining at least one of the first and second divided resource groups based on the corresponding one of the first and second centers of activity relative to the network location of the computing node.

19. The method of claim 18, wherein the collection of data elements is a distributed database having a table of records, each record having at least first and second elements, the arbitrating including splitting the first and second elements of each of the records into the first and second portions of the collection of data elements, respectively.

20. A computing node comprising:

a resource group arbitration module configured for:

(1) identifying available resource groups within a network, each resource group having corresponding resource group attributes including a data attribute and a resource requirement for providing a corresponding distributed computing service within a network, the data attribute specifying at least one center of activity within a topology of the network for a corresponding collection of data elements associated with the distributed computing service, the center of activity representing a location, within the topology, of a determined logical origin for all access attempts of any of the data elements within the corresponding collection of data elements;

(2) identifying one of the available resource groups having the corresponding at least one center of activity that is closest to a network location of the computing node; and (3) selectively joining the one available resource group based on determining the corresponding resource requirement is less than an available node capacity, and based on a determined network distance between the network location and the at least one center of activity; and computing node resources including a storage medium for receiving and storing receiving a replica of at least a portion of the collection of data elements based on the corresponding at least one center of activity.

21. The computing node of claim 20, wherein the resource group arbitration module is configured for:

detecting a need for a change in the resource group attributes for the one available resource group based on determining the at least one center of activity has moved beyond an identifiable distance from at least a subset of other computing nodes having joined the one available resource group;

arbitrating, between the other computing nodes having joined the one resource group, for dividing the one resource group into first and second divided resource groups having first and second portions of the collection of data elements with first and second centers of activity, respectively; and selectively joining at least one of the first and second divided resource groups based on the corresponding one of the first and second centers of activity relative to the network location of the computing node.

22. The computing node of claim 21, wherein the collection of data elements is a distributed database having a table of records, each record having at least first and second elements, the arbitrating including splitting the first and second elements of each of the records into the first and second portions of the collection of data elements, respectively.

23. A computing node comprising:

first means for:

(1) identifying available resource groups within a network, each resource group having corresponding resource group attributes including a data attribute and a resource requirement for providing a corresponding distributed computing service within a network, the data attribute specifying at least one center of activity within a topology of the network for a corresponding collection of data elements associated with the distributed computing service, the center of activity representing a location, within the topology, of a determined logical origin for all access attempts of any of the data elements within the corresponding collection of data elements;

(2) identifying one of the available resource groups having the corresponding at least one center of activity that is closest to a network location of the computing node; and (3) selectively joining the one available resource group based on determining the corresponding resource requirement is less than an available node capacity, and based on a determined network distance between the network location and the at least one center of activity; and second means for receiving and storing receiving a replica of at least a portion of the collection of data elements based on the corresponding at least one center of activity.

24. The computing node of claim 23, wherein the first means is configured for:

detecting a need for a change in the resource group attributes for the one available resource group based on determining the at least one center of activity has moved beyond an identifiable distance from at least a subset of other computing nodes having joined the one available resource group;

arbitrating, between the other computing nodes having joined the one resource group, for dividing the one resource group into first and second divided resource groups having first and second portions of the collection of data elements with first and second centers of activity, respectively; and selectively joining at least one of the first and second divided resource groups based on the corresponding one of the first and second centers of activity relative to the network location of the computing node.

25. The computing node of claim 24, wherein the collection of data elements is a distributed database having a table of records, each record having at least first and second elements, the arbitrating including splitting the first and second elements of each of the records into the first and second portions of the collection of data elements, respectively.

* * * * *